United States Patent
Rømer

(10) Patent No.: US 11,629,977 B2
(45) Date of Patent: *Apr. 18, 2023

(54) WATER METER WITH WATER MANAGEMENT CAPABILITIES

(71) Applicant: Kamstrup A/S, Skanderborg (DK)

(72) Inventor: Daniel Beck Rømer, Skanderborg (DK)

(73) Assignee: Kamstrup A/S, Skanderborg (DK)

( * ) Notice: Subject to any disclaimer, the term of this patent is extended or adjusted under 35 U.S.C. 154(b) by 958 days.

This patent is subject to a terminal disclaimer.

(21) Appl. No.: 16/502,792

(22) Filed: Jul. 3, 2019

(65) Prior Publication Data
US 2020/0011721 A1  Jan. 9, 2020

(30) Foreign Application Priority Data
Jul. 5, 2018  (EP) .................................... 18181936

(51) Int. Cl.
| | | |
|---|---|---|
| *G05D 7/06* | (2006.01) | |
| *G01F 22/00* | (2006.01) | |
| *G06Q 50/06* | (2012.01) | |
| *G01D 4/00* | (2006.01) | |
| *G01F 15/00* | (2006.01) | |

(52) U.S. Cl.
CPC ........... *G01D 4/002* (2013.01); *G01F 15/003* (2013.01); *G01F 15/005* (2013.01); *G05D 7/0635* (2013.01); *G06Q 50/06* (2013.01); *H04Q 2209/60* (2013.01)

(58) Field of Classification Search
None
See application file for complete search history.

(56) References Cited

U.S. PATENT DOCUMENTS

| | | |
|---|---|---|
| 8,539,827 B2 | 9/2013 | Benson et al. |
| 10,561,078 B2 * | 2/2020 | Darnold ................. A01G 25/16 |
| 11,449,081 B2 * | 9/2022 | Rømer ................... G01F 15/005 |
| 2010/0147394 A1 | 6/2010 | Trnka et al. |

(Continued)

FOREIGN PATENT DOCUMENTS

| | | | |
|---|---|---|---|
| CN | 205066251 U | * | 3/2016 |
| CN | 205506140 U | * | 8/2016 |

(Continued)

*Primary Examiner* — Curtis A Kuntz
*Assistant Examiner* — Jerold B Murphy
(74) *Attorney, Agent, or Firm* — Renner, Otto, Boisselle & Sklar, LLP

(57) ABSTRACT

A water utility meter configured for dynamic throttling and arranged to register and manage the amount of water delivered to a consumption site from a distribution network is disclosed. The water utility meter comprises a flow sensor for measuring a flow rate through the water utility meter, a valve for limiting the flow rate from the distribution network to the consumption site, an actuator for changing a valve position so that the valve may be in an open position or a closed position or a variable throttling position and a controller unit arranged to control the actuator. The controller unit is further configured to monitor the flow rate using the flow sensor, to verify if the flow rate exceeds a maximum flow rate limit or does not exceed a minimum flow rate limit and if the limits are exceeded adjust the valve position to change the maximum flowrate.

20 Claims, 2 Drawing Sheets

(56) References Cited

U.S. PATENT DOCUMENTS

2014/0261714 A1    9/2014  Burt
2017/0356779 A1   12/2017  Stuyvenberg et al.
2020/0011722 A1*   1/2020  Rømer ................. G05D 7/0623

FOREIGN PATENT DOCUMENTS

| EP | 1949042    |    | 7/2008 |
| WO | 2007045509 | A1 | 4/2007 |
| WO | 2008009032 | A2 | 1/2008 |
| WO | 2008009032 | A3 | 1/2008 |
| WO | 2013138537 | A1 | 9/2013 |
| WO | 2013138537 | A9 | 9/2013 |

* cited by examiner

WATER METER WITH WATER MANAGEMENT CAPABILITIES

This application claims priority to European Patent Application No. 18181936.8 filed on Jul. 5, 2018, which is hereby incorporated herein by reference.

FIELD OF THE INVENTION

The present invention relates to the area of water utility meters with water management capabilities and integrated valves for limiting the water flow from the distribution network through the meter to a consumption site.

BACKGROUND OF THE INVENTION

Water utilities over the world experience that the water resources available are limited and the production capacity of the water utility plants is insufficient to meet the demand from the consumers. Mechanisms for sharing the available resources between consumers are thus required, to ensure that all end users have at least a minimum volume of water at their disposal. This can be obtained by limiting the amount of water delivered to each consumption site e.g. by use of a valve with a throttling function limiting the maximum flow rate into a consumption site. The purpose of limiting the maximum flow rate in a water utility meter is to limit the consumed amount of water and peak flows rather than to achieve a level of constant flow.

Further the water utility companies experience consumers not paying the water bill and thus wanting to disconnect the consumption site from the distribution network. However, a total shutoff of the water supply to a consumption site such as a private residence may not be acceptable in that leaving residents and animals without access to drinking water may be fatal. Thus, dynamic mechanisms for limiting the amount of water delivered is desired.

Water utility meters with integrated valves are known and including throttling functions is also known e.g. in U.S. Pat. No. 8,539,827B2 where a valve integrated in a water meter is disclosed. The valve may be in an open position a closed position or a throttling position where the flow is reduced to 5-15% of normal flow.

The utility distribution network does however not deliver water with the same input pressure to all consumption sites and the pressure will additionally be varying over time. Thus, a static throttling position of a valve will lead to a varying maximum flow, depending on consumption site and actual pressure delivered by the utility distribution network.

Using a general and constant throttling level for all consumers at all times, will cause a limited maximum flow which may lead to inconvenience for all consumers independent on their consumption pattern. Consumers who are by their own motion limiting the water usage, might not need to have the maximum flow limited. However, if such a consumer is changing behaviour a restriction on the maximum flow may need to be applied.

A typical domestic water consumption site may have a max flow of approximately 1000 l/h. Throttling down to 5-15% still allows for the use of 50-150 l/h which still may be more than desired by the water utility. Throttling accurately below 5% is however difficult due to the risk of totally shutting of the supply to the consumer e.g. due to: plaques growing on the valve parts; unwanted bodies flowing with the water and clotting the valve opening; or inaccurate control of the valve opening.

Water utility meter are often battery operated with an expected battery life time of up to 20 years. Adjusting the throttling level by adjusting the valve is an energy consuming operation which should be initiated rarely to reduce energy consumption.

Hence, a water utility meter with improved water management capabilities would be advantageous. In particular, a more efficient, accurate and reliable mechanism for limiting the water usage, while not causing unneeded or undesired inconvenience to the consumers, would be advantageous. Furthermore, the mechanism shall be energy conserving and adapted to the non-continuous flow pattern at a typical water consumption site such as a private residence.

OBJECT OF THE INVENTION

It is a further object of the present invention to provide an alternative to the prior art. In particular, it may be seen as an object of the present invention to provide a water utility meter with water management capabilities that solves the above-mentioned problems of the prior art.

SUMMARY OF THE INVENTION

Thus, the above described object and several other objects are intended to be obtained in a first aspect of the invention by providing a water utility meter configured for dynamic throttling and arranged to register the amount of water delivered to a consumption site from a distribution network, the water utility meter comprising, —a flow sensor for measuring a flow rate through the water utility meter, a valve for limiting the flow rate from the distribution network to the consumption site, an actuator for changing a valve position so that the valve may be in an open position or a valve position or a variable throttling position, a controller unit for controlling the position of the valve, the controller unit further being configured for, monitor the flow rate using the flow sensor, and if the flow rate exceeds a maximum flow rate limit adjust the valve position to reduce the flow rate, and if the flow rate does not exceed a minimum flow rate limit adjust the valve position to increase the flow rate.

The water utility meter of the above embodiment provides a device for measuring water consumption and effectively managing the water delivered to the consumer. Management of the water is provided by adjusting the position of the valve according to the measured flow rate and the minimum/maximum flow rate limits which may be defined by the water utility, whereby a dynamic throttling mechanism is obtained. Adjusting the valve position dynamically according to the measured flow has the effect that the maximum flow is limited accurately at every different consumption site. A further advantage is that the maximum flow rate does not change due to changes in water pressure or other ambient conditions. Yet another advantage is that the maximum flow rate may be adjusted accurately down to very low maximum flow rates without risking an undesired long term total disconnection of the water supply. Further the water utility meter will automatically increase the valve opening in case a foreign object gets caught in a small valve opening.

The registration of the water consumption may be used for billing purposes and the water utility meter may be a legal meter, i.e. a meter which is subdued to regulatory demands. Such regulatory demands may be demands to the precision of the measurements. The water utility meter may be battery operated, thus having limited energy resources available for adjusting the position of the valve, thus any mechanisms reducing the need for adjusting the position of the valve is advantageous.

The water utility meter comprises a flow sensor which may be based on any suitable flow measurement technology e.g. an ultra-sonic flow meter based on the transit time principle. The flow sensor may output a flow rate signal which can be integrated over a time period to provide a volume. Other flow sensors may output a volume signal comprising increments of consumed volume or an accumulated volume, such a signal may be differentiated to obtain a flow rate. Thus, a flow sensor arranged to measure a flow rate of water delivered to the consumption site may as well be construed as a flow sensor arranged to measure the volume of water delivered to the consumption site.

The valve may be any kind of suitable valve such as a: ball valve; butterfly valve; needle valve, diaphragm valve; gate valve; plug valve or other mechanical valves. The position of the valve may be changed by use of an actuator to be in an open position, a closed position or a variable throttling position, where the variable throttling position may be any position in between the closed and open position. In the throttling position and the closed position, the valve is limiting the flow rate from the distribution network to the consumption site. Even at times of zero flow the valve is said to be limiting the flow when in the throttling position and the closed position. When the flow rate is observed to exceed the maximum flow rate limit the position of the valve is adjusted so as to reduce the opening of the valve, whereby the flow rate is effectively limited.

Monitoring the flow rate is to be construed as obtaining any data containing information about the flow rate. Monitoring the changes of an accumulated volume register or registering pulses indicative of a consumed volume or volume flow does all when related to time include information about the flow rate and. Monitoring the flow rate may include processing the obtained data by filtering or any kind of well-known mathematic and statistical operations such as: integration; differentiation; calculation of delta values, accumulated values, maximum values, minimum values; statistical moments including average values etc.

Peak flows of short duration have a very limited influence on the total water consumption as they represent a very limited volume of consumed water thus, a water utility meter wherein the valve position is adjusted by the controller unit to reduce the flow rate if the flow rate has exceeded the maximum flow rate limit continuously for a first time duration may be advantageous in that short bursts of high flow rate is disregarded. To compensate for a highly dynamic consumption profile including short burst of high flow summing up to a considerable volume of water it may be advantageous to calculate the average flow over a time period to have a water utility meter wherein the valve position is adjusted by the controller unit to reduce the flow rate if the average flow rate measured over a first time duration exceeds the maximum flow rate limit. The first time duration may be in the range of 5 seconds to 240 seconds. The first time duration may preferably be in the range 5-120 seconds or more preferably in the range 5-60 seconds.

By nature, a consumption profile of a water consumption site often includes several periods of zero consumption or close to zero consumption. It is advantageous if such periods of low consumption do not lead to immediate adjustments of the valve. Thus a water utility meter wherein the valve position is adjusted by the controller unit to increase the flow rate if the flow rate has been continuously below the minimum flow rate limit for a second time duration may be advantageous. One effect is that energy consumption for adjusting the valve is reduced by the water utility meter being reluctant to increase the valve opening due to shorter periods of low or zero consumption. A further advantage is that it not is possible to manipulate the water utility meter to increase the valve opening by having short periods of zero consumption. The second time duration may be in the range of 12 hours to 1 week. In general, it may be advantageous if the first time duration is shorter than the second time duration. The second time duration may preferably be in the range of 1-48 hours or even more preferably 1-24 hours to avoid leaving any human beings without drinking water for an extended period of time.

Limiting the water consumption by throttling may be experienced as a reduction in service level by the consumer, thus only limiting the consumption to consumption sites having already consumed a large volume water during a defined time period, may be advantageous. Further this has the advantage of limiting the energy consumed for changing valve position. Thus, it may be advantageous to arrange the controller unit to adjust the valve position to decrease the flow rate if a maximum volume of water has been delivered to the consumption site and where the maximum volume is calculated over a period of 12 hours to 1 month. Thus the controller unit will only adjust the valve position to reduce the flow rate if the maximum volume has been exceeded and the flow rate exceeds the maximum flow rate limit. The maximum volume may in some cases be calculated over a period matching the billing period, such as e.g. 2 or 3 or 6 or 12 months. In other scenarios the maximum volume is calculated over a shorter period to restrict the water consumption in case of an acute water shortage situation, in such cases the volume may be calculated over a few hours, such as 1-24 hours. The maximum value is depending on the period over which it is calculated and may be in the range of 1-10 $m^3$/month.

To obtain an efficient and accurate throttling function high flexibility in adjusting the valve position is required. Thus, a water utility meter wherein the valve position can be adjusted to be in at least 2 different throttling positions is advantageous. It may be even more advantageous if the valve position can be adjusted to be in 3-10 throttling positions. Even more accurate throttling function may be obtained in a water utility meter where the valve position is continuously adjustable. In that case the valve position may be continuously adjustable by a valve actuator supporting continuously adjustments of the valve position.

Adjustment of the valve position has the purpose of limiting the maximum flow rate to match the maximum flow rate limit. This may be performed in a number of steps where the valve position is changed in increments of varying size depending on factors such as the flow rate, water pressure, current position of the valve etc. A water utility meter, wherein the valve position is adjusted in increments/decrements by the controller unit and the size of increments is different from the size of decrements may have the advantage that the reaction time for limiting the flow rate is different from the reacting time for allowing an increased flow rate. A water utility meter where the increments are smaller than the decrements may have the advantage of a fast reaction to a high flow rate while reactions to low flow rates is slower. The size of increments/decrements shall be construed as the amount of adjusting the valve position. E.g. for a ball valve having a ball element which may be adjusted by rotation between 0 and 180 degrees an increment size of 2 degrees may be chosen, resulting in 90 increments/decrements between the two outer positions. Since the flow characteristic of the valve may be non-linear depending on the type of valve, the increment/decrement size may depend on the current valve position.

A water utility meter wherein the size of increments/decrements when adjusting the valve position depends on the difference between the measured flow rate and one of the minimum flow rate limit or maximum flow rate limit, has the advantage that the risk of overshooting when limiting the flow rate is reduced.

The change in flow rate may not be directly proportional to the adjustment of the valve position, thus it might be advantageous if the size of increments/decrements when adjusting the valve position depends on the difference between the measured flow rate and one of the minimum flow rate limit or maximum flow rate limit and the current position of the valve.

To avoid an automatic total shutoff of the water supply to the consumption site a water utility meter wherein the adjustment of the valve position due to the flow rate exceeding the maximum flow rate limit not will change the valve position to exceed a first extreme valve position may be advantageous. The first extreme position is a position leaving a small valve opening preventing a total shot off.

To minimize the amount of energy needed for changing the valve position a water utility meter wherein the adjustment of the valve position due to the flow not exceeding the minimum flow rate limit not will change the valve position to exceed a second extreme valve position may be advantageous. The second extreme position is a valve position having a large valve opening, in the range of 50-90% of the maximum valve opening. Such a valve opening is allowing for an almost unrestricted flow, while at the same not requiring the use of energy for opening the valve totally.

To optimize adjustment of the valve position, the water utility meter may further comprise means for determining the valve position. Means for determining the valve position may be used for adapting the increment/decrement size when adjusting the valve position. A water meter having knowledge of the relationship between the valve position and the valve opening may calculate the expected effect of a changed valve position and adjust the increment/decrement sizes accordingly. The water utility meter may keep track records of historical maximum flow rates at different valve positions and use these track records for adjusting the valve position. This has the advantage of a fast, accurate and energy conserving valve adjustment.

The water utility meter may further comprise a communication interface arranged to receive and transmit data messages from a communication partner and whereby one or more of the minimum flow rate limit, maximum flow rate limit, first time duration, second time duration, increment size, decrement size can be changed by the communication partner. Water utility meters may comprise one or more communication interfaces such a wired or wireless M-Bus, Cellular technologies e.g. 2G, 3G, 4G, 5G or NB-IOT, WIFI, LORA, Sigfox or proprietary communication interfaces. The communication interfaces may be used for connecting the water meter to an advanced metering infrastructure or to do drive by readings of the meter. The rules used by the controller unit for water management may be updated through the communication interface which has the advantage that the water management function may be adjusted to match changing conditions in the utility distribution network or utility plant. The water utility meter may further be arranged to open or close the valve of the water meter as a response to a communication received on a communication interface.

The valve may be controlled by a common microprocessor which also controls the flow meter and/or the meter register which register the consumed volume of water. Further the control of the communication interface and communication protocols may be implemented in such a common micro controller as well.

The individual aspects of the present invention may each be combined with any of the other aspects. These and other aspects of the invention will be apparent from the following description with reference to the described embodiments.

BRIEF DESCRIPTION OF THE FIGURES

The water utility meter with water management functions according to the invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
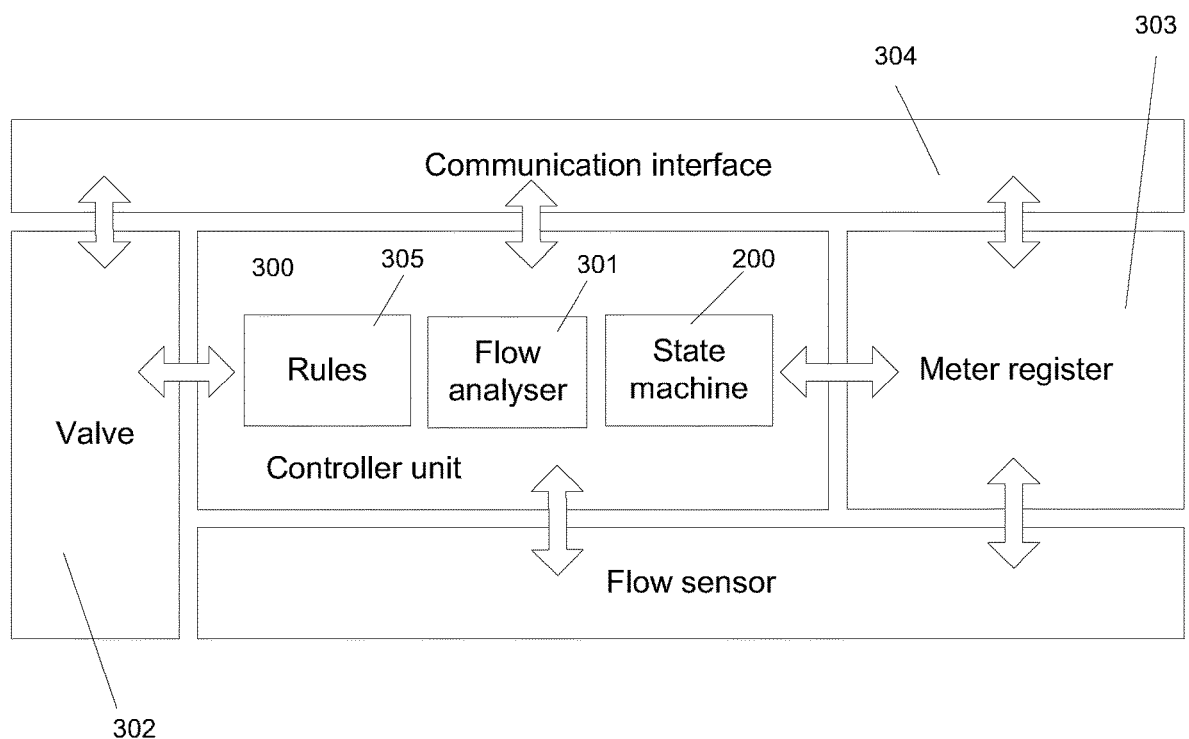
FIG. 1 shows a functional diagram of the water utility meter.

FIG. 1 show a functional diagram of a water utility meter with water management functionality. The water utility meter comprises multiple functional elements. The water utility meter is arranged to measure, monitor and register a flow rate/volume of water flowing through the utility meter from a distribution network into a consumption site. Further the meter is arranged to manage the delivery of water to the consumption site in that it controls a valve to limit the maximum flow rate of the water consumed. The water utility meter limits the amount of water consumed according to a set of rules 305. The water utility meter compares the measured flow rate values to the set of rules, if the flow breaches the set of rules, the water utility meter will adjust the position of the valve 302 so that the valve will have a throttling function and thereby regulate the water consumption by limiting the maximum flow rate. Hereby a dynamic throttling function is obtained. The purpose and effect of limiting the maximum flow rate in a water utility meter is to limit the total amount of water consumed and minimize peak flows in the utility distribution network rather than to achieve a level of constant flow through the utility meter into the consumption site. The flow sensor is arranged to measure the flow of water into the consumption site. The valve 302 is arranged to connect/disconnect the consumption site from the utility distribution network and to limit the amount/maximum flow rate of water delivered to the consumption site by applying a throttling function. The meter register, 303 is arranged to register at least the volume of water delivered to the consumption site and may register other parameters such as flow rates, peak flow, minimum flow, analyse the flow to detect leaks or burst in the installations at the consumption site. Further, the meter register may detect/register other events and parameters such as: tamper, sensor errors, dry meter, water temperature, ambient temperature etc. The communication interface 304 enables one or more wired or wireless communication interfaces suitable for communicating with external devices such as mobile or stationary meter reading devices. The controller unit 300 implements the water management functionality. The arrows on FIG. 1 indicates communication paths between the functional elements. Two functional elements, which are not directly connected may use an intermediate functional element as a communication channel for peer communication. The different functional elements may be implemented in HW or SW or a combination of both. The SW elements may be implemented in a common micro controller or in different micro controllers.

The controller unit 300 implements the water management functionality. Input to the controller unit comprises the rules 305 for limiting the maximum flow rate and flow data from the flow sensor. The controller unit 300 is implemented comprising two functional subunits: a state machine 200 and a flow analyser 301. The two functional subunits together determine if the rules are breached and control the valve 302 accordingly. When the controller unit receives a request to manage the supply of water the flow analyser and state machine is initiated and a monitoring function is as such started. The controller unit may also use data from the meter register 303 such as historical flow data and accumulated volume values.

The rules are implemented comprising a data structure in a non-volatile memory of the water utility meter. The rules comprise a maximum flow rate limit and a minimum flow rate limit. The rules may also comprise a first and a second time duration related to the maximum flow rate limit and the minimum flow rate limit respectively. The rules may further comprise a maximum volume limit and a period for calculating the maximum volume. The rules may as well comprise information regarding the method of calculating the values such as peak values, minimum values and average values. The rules may be updated through the communication interface 304.

The flow analyser 301 in FIG. 1 receives flow data from the flow sensor and processes the data to obtain metrics suitable for evaluating if the rules are breached. The flow analyser calculates: the flow rate, the accumulated volume; the maximum flow; the minimum flow and other metrics suitable for evaluating if the flow breaches the rules. The metrics are calculated as peak values, minimum values, maximum values, average values over different time periods, according to the rules 305. The flow analyser compares the metrics, calculated based on the flow data, to the rules and generates events when a rule is breached or not breached anymore. The generated events are fed into the state machine 200 as events, which may trigger a state transition. If any of the first or second time duration or the first time period is defined in the rules an event will not be generated until all elements in a rule is breached e.g. the flow rate has been above the maximum flow rate limit for a duration longer than the first time duration.

The flow analyser applies standard calculus functions including integration and differentiation to flow data received from the flow sensor. If flow data from the flow sensor are equidistant samples of the flow rate or accumulated volume simple functions as addition and subtraction may be sufficient to generate the needed metrics. Other flow sensors may deliver a pulse for each consumed quantity which as well can be converted to a flow rate and accumulated volume applying well known methods.

Figure 2:
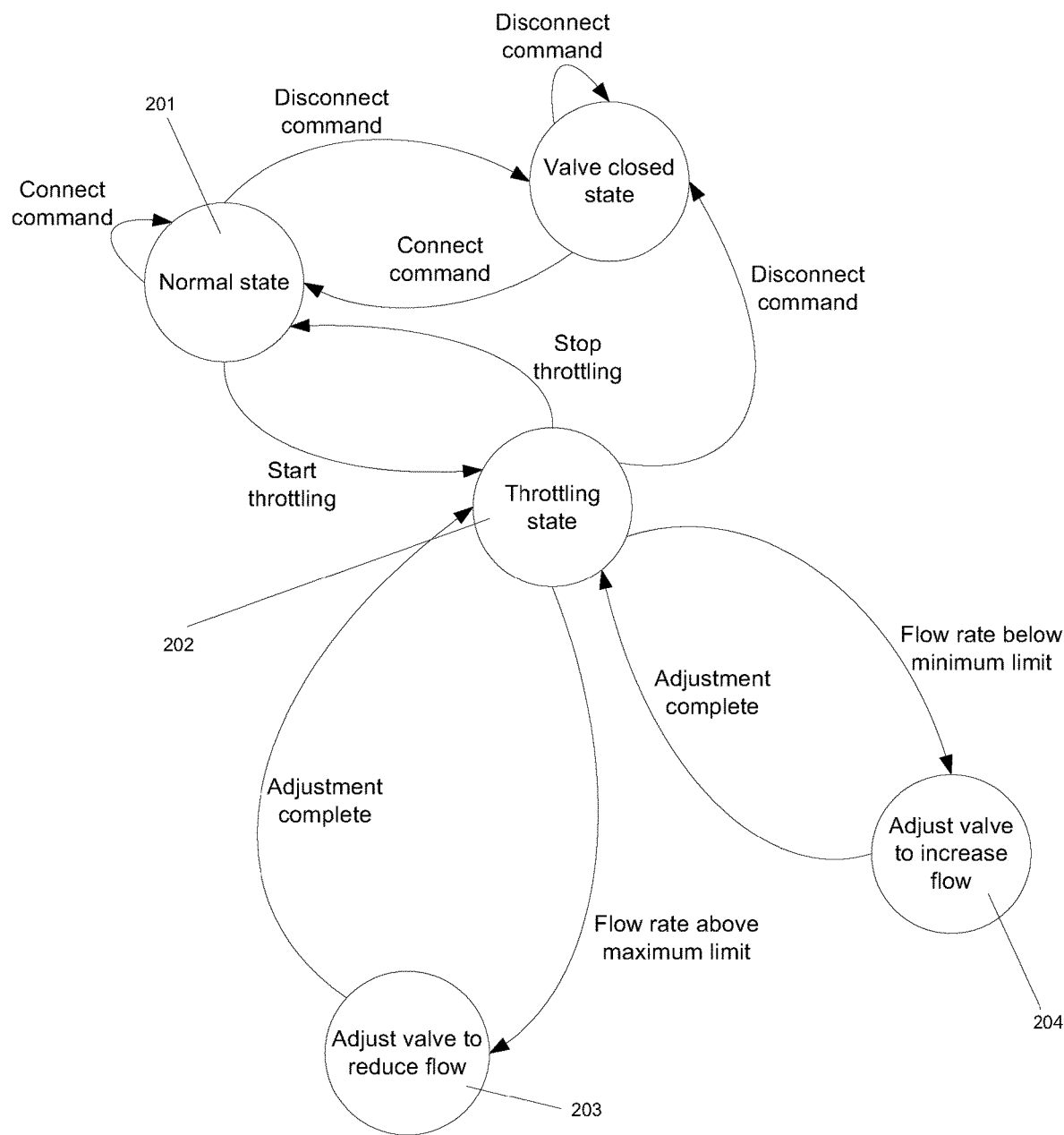
FIG. 2 illustrates a state machine for implementing the water management functionality.

FIG. 2 shows an example of the state machine 200 in FIG. 1. The state machine comprises multiple states and transitions between the states. The transitions are shown as arrows between the states. The state machine may comprise more states than shown in FIG. 2. A transition between states is caused by one or more specific events, the events causing a transition is shown at the arrow of the transition. The output from the flow analyser 301 is fed into the state machine as events, these events include, but are not limited to, events such as: flow rate above maximum flow rate limit and flow rate below minimum flow rate limit. External inputs are fed into the state machine as events, these events include but are not limited to: connect command; disconnect command, start throttling, and stop throttling.

In the normal state the throttling function is inactive. In this state the controller unit may receive a command to close the valve or to start the throttling function. When receiving a command to start the throttling function a state transition to the throttling state 202 is initiated and the flow analyser is started. In the case that a rule is breached the throttling state will receive an event from the flow analyser that the flow rate is below the minimum flow rate limit or that the flow rate is above the maximum flow rate limit. The two events requiring that the valve is adjusted to increase the flow rate or to reduce the flow rate respectively. At the time of receiving the event the flow analyser has determined that all elements of a rule have been breached. The event may include additional information regarding the severity of the breach such as the difference between the maximum flow rate limit and the measured average flow rate. The throttling state may forward this information to one of the two adjust valve states 203, 204 to be used for adapting the adjustment of the valve position. The Throttling state may also keep a track record of the events coming from the flow analyser to be used as input for the adjust valve states.

When a rule has been breached a transition from the throttling state to one of the two adjust valve states 203, 204 is initiated. The adjust valve states will adjust the position of the valve to allow an increased or decreased maximum flow rate.

The valve position is adjusted in increments, the size of increments may be static or dynamic changing according to the difference between the measured flow rate and the maximum flow rate limit or the number, so that a large difference causes a larger step size while a smaller difference causes a smaller step size. Dynamic increment sizes have the advantage of lowering the risk of under/over shooting when adapting the maximum flow rate. It may further be beneficial to apply a larger increment size when decreasing the maximum flow rate than when increasing the maximum flow rate. This has the effect of a faster reaction to flow rates above the maximum flow rate limit than to flow rates below the minimum flow rate limit. The increment size may also be adjusted to compensate for nonlinear characteristics of the valve. By knowing the current valve position and the characteristics of the valve the increment size causing the wanted effect can be calculated. Further the adjust valve state may keep a history of previous valve positions and the maximum flow rate at these positions which may be used for adjusting the valve.

Adjustment of the valve position may not happen instantly. The actuator used and the energy available for the adjustment may cause a process time for adjusting the valve position. The process time for adjusting the valve position will be depending on the specific valve and actuator, adjusting the valve position form open to closed position may last for up to several minutes.

When the adjustment of the valve position is accomplished a state transition from the adjust valve state 203, 204 to the throttling state 202 is initiated. The throttling state may signal to the flow analyser 301 that an adjustment of the valve position has been finished, the flow analyser may then restart calculation periods, to exclude periods of valve adjustments from the calculations. This has the advantage that a judgement of breaching the rules is based entirely on data obtained after the valve was set in the new position. The Throttling state and or the two adjustment states may further select to postpone or disregard events requiring an adjustment of the valve position if the energy for adjusting the position is not available or if the energy amount reserved for such actions has been used. This has the advantage of protecting the energy reserve of the battery from being used for numerous valve adjustments.

It is to be understood by the skilled person that the state machine may include further elements than those illustrated in FIG. 2. Any of the states may have multiple associated actions to be performed when entering or exiting the state. An associated action may depend on the event triggering the transition. As an example, when a transition from normal state 201 to valve closed state occur due to a disconnect command event an action performed, which is to close the valve. These actions are not shown in FIG. 2. The state machine may include further states or intermediate states or decisions between states which are also not included in FIG. 2. The state machine may be realized as a SW function in a micro controller or as a HW realization e.g. in a FPGA.

To optimize adjustment of the valve position, the water utility meter may further comprise a position sensor for determining the valve position. In one embodiment, the valve may be a ball valve including a valve ball arranged to control the flow rate. The valve ball is rotated by a valve stem and the position sensor includes circuitry for controlling the rotational position of a valve stem. The circuitry includes a sensing disc provided on a side of a printed circuit board (PCB) facing towards the valve stem. The sensing disc comprises a number of separate conductive regions, such as four 90 degrees circle wedges. Additionally, a rotation member is connected with the valve stem. The rotation member includes two oppositely arranged conductive and electrically connected circle wedges constituting a sensor plate.

By arranging the sensor plate of the rotation member opposite the conductive regions of the sensing disc, a capacitor construction is realized. Each of the conductive regions are connected to an integrated circuit of a processor provided on in the water utility meter and by applying a potential to one of the conductive regions and grounding the others, an electrical circuit may be created.

As the sensor plate rotates with the valve stem above the conductive regions, variable capacitances are created between the separate circle wedges of the sensor plate and the separate conductive regions. As the capacitance of a capacitor depends on the area of the overlap between the conductive region and the sensor plate, the capacitance of each of the variable capacitors reaches a maximum when a circle wedge is positioned directly above a conductive region. As the rotating member always overlaps at least two conductive regions a circuit including two serial coupled capacitors is created. A first capacitor is created between a first conductive region coupled to a potential and the sensor plate and a second capacitor is created between the sensor plate and one or more of the other conductive regions.

The integrated circuit connected to the conductive regions is capable of giving a measure of the capacitance of each conductive region in a given instance of time. By tracking and processing this measure of capacitance for each conductive region, it is possible to determine the equivalent absolute position of the rotation member, as the capacitance of the regions changes in a well-defined manner.

A position sensor for determining the valve position may be used for adapting the increment/decrement size when adjusting the valve position. A water meter having knowledge of the relationship between the valve position and the valve opening may calculate the expected effect of a changed valve position and adjust the increment/decrement sizes accordingly.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A water utility meter configured for dynamic throttling and arranged to register the amount of water delivered to a consumption site from a distribution network, the water utility meter comprising:
   a flow sensor for measuring a flow rate through the water utility meter;
   a valve for limiting the flow rate from the distribution network to the consumption site;
   an actuator for changing a valve position so that the valve may be in an open position or a closed position or a variable throttling position; and
   a controller arranged to control the actuator, the controller further being configured to:
      monitor the flow rate using the flow sensor,
      if the flow rate exceeds a maximum flow rate limit continuously for a first time duration, adjust the valve position to reduce the flow rate, and
      if the flow rate has been continuously below a minimum flow rate limit for a second time duration, adjust the valve position to increase the flow rate, wherein the first time duration is shorter than the second time duration.

2. A water utility meter according to claim 1, wherein the water utility meter further comprises a communication interface arranged to receive and transmit data messages from a communication partner and wherein one or more of the minimum flow rate limit, maximum flow rate limit, first time duration, second time duration, an increment size, or a decrement size can be changed by the communication partner.

3. A water utility meter according to claim 1, wherein the valve position is adjusted by the controller to reduce the flow rate if the average flow rate measured over the first time duration has exceeded the maximum flow rate limit.

4. A water utility meter according to claim 1, wherein the water utility meter further comprises means for determining the valve position.

5. A water utility meter according to claim 1, wherein the adjustment of the valve position due to the flow rate exceeding the maximum flow rate limit will not cause the valve position to exceed a first extreme valve position.

6. A water utility meter according to claim 1, wherein the first time duration is in the range of 15 seconds to 240 seconds.

7. A water utility meter according to claim 1, wherein the second time duration is in the range 12 hours to 1 week.

8. A water utility meter according to claim 1 wherein the controller is arranged to adjust the valve position to decrease the flow rate if a maximum volume of water has been delivered to the consumption site and where the maximum volume is calculated over a period of 12 hours to 1 month.

9. A water utility meter according to claim 1, wherein the valve position can be adjusted to one of at least 2 different throttling positions.

10. A water utility meter according to claim 1, wherein the valve position is adjusted in increments and decrements by the controller and the size of increments is different from the size of decrements.

11. A water utility meter according to claim 10, wherein the size of increments or decrements when adjusting the valve position depends on the difference between the measured flow rate and at least one of the minimum flow rate limit or maximum flow rate limit.

12. A water utility meter according to claim 11, wherein the size of increments or decrements when adjusting the valve position further depends on the current position of the valve.

13. A water utility meter configured for dynamic throttling and arranged to register the amount of water delivered to a consumption site from a distribution network, the water utility meter comprising:

a flow sensor for measuring a flow rate through the water utility meter;

a valve for limiting the flow rate from the distribution network to the consumption site;

an actuator for changing a valve position so that the valve may be in an open position or a closed position or a variable throttling position; and a controller arranged to control the actuator, the controller further being configured to:

monitor the flow rate using the flow sensor, if the flow rate exceeds a maximum flow rate limit, adjust the valve position to reduce the flow rate, if the flow rate does not exceed a minimum flow rate limit, adjust the valve position to increase the flow rate, and if a maximum volume of water has been delivered to the consumption site, adjust the valve position to reduce the flow rate, wherein the maximum volume is calculated over a period of 12 hours to 1 month.

14. A water utility meter according to claim 13, wherein the water utility meter further comprises a communication interface arranged to receive and transmit data messages from a communication partner and wherein one or more of the minimum flow rate limit, maximum flow rate limit, a first time duration, a second time duration, an increment size, or a decrement size can be changed by the communication partner.

15. A water utility meter according to claim 13, wherein the size of increments or decrements when adjusting the valve position depends on the difference between the measured flow rate and at least one of the minimum flow rate limit or maximum flow rate limit.

16. A water utility meter according to claim 13, wherein the valve position is adjusted in increments and decrements by the controller and the size of increments is different from the size of decrements.

17. A water utility meter according to claim 13, wherein the valve position is adjusted by the controller to reduce the flow rate if the flow rate has exceeded the maximum flow rate limit continuously for a first time duration.

18. A water utility meter according to claim 17, wherein the valve position is adjusted by the controller to increase the flow rate if the flow rate has been continuously below the minimum flow rate limit for a second time duration.

19. A water utility meter according to claim 17, wherein the first time duration is in the range of 15 seconds to 240 seconds.

20. A water utility meter according to claim 17, wherein the second time duration is in the range 12 hours to 1 week.

* * * * *